(12) United States Patent
Sommer et al.

(10) Patent No.: US 11,410,328 B1
(45) Date of Patent: Aug. 9, 2022

(54) TECHNIQUES FOR MAINTAINING FEATURE POINT MAPS

(71) Applicant: Apple Inc., Cupertino, CA (US)

(72) Inventors: Bruno M. Sommer, Sunnyvale, CA (US); Alexandre da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/861,772

(22) Filed: Apr. 29, 2020

Related U.S. Application Data

(60) Provisional application No. 62/841,129, filed on Apr. 30, 2019.

(51) Int. Cl.
  *G06T 7/73* (2017.01)
  *G06K 9/62* (2022.01)
  *G06T 7/246* (2017.01)

(52) U.S. Cl.
  CPC ............ *G06T 7/73* (2017.01); *G06K 9/628* (2013.01); *G06T 7/246* (2017.01)

(58) Field of Classification Search
  CPC ........... G06K 9/00664; G06K 9/00671; G06K 9/00791; G06K 9/6202; G06K 9/6262; G06K 9/46; G06K 9/4604; G06K 9/6267; G06K 9/6289; G06K 9/00208; G06K 9/623; G06K 9/6232; G06K 9/6251; G06K 9/00201; G06K 9/00711; G06K 9/00805; G06K 9/00986; G06K 9/03; G06K 9/036; G06K 9/18; G06K 9/209; G06K 9/4628; G06K 9/4661; G06K 9/4676; G06K 9/6228; G06K 9/6296; G06K 9/72; G06K 2009/3225; G06K 2009/3291; G06K 2009/27; G06K 2009/29; G06K 9/00624; G06K 9/3208; G06K 9/4671; G06K 9/6201; G06K 9/6211; G06K 9/6268; G06K 9/6282; G06K 9/00744; G06K 9/00993; G06K 9/2027; G06K 9/2054; G06K 9/3241; G06K 9/4623; G06K 9/4642; G06K 9/4652; G06K 9/48; G06K 9/6215; G06K 9/6248; G06K 9/6271; G06K 9/6273; G06T 2207/30244; G06T 7/73; G06T 7/74; G06T 7/55; G06T 1/20; G06T 3/00
See application file for complete search history.

(56) References Cited

U.S. PATENT DOCUMENTS

| | | | |
|---|---|---|---|
| 2014/0267234 A1* | 9/2014 | Hook | G06T 19/006 345/419 |
| 2017/0363738 A1* | 12/2017 | Kaino | G01S 13/343 |

(Continued)

*Primary Examiner* — Ian L Lemieux
(74) *Attorney, Agent, or Firm* — Dentons US LLP

(57) ABSTRACT

This disclosure relates to maintaining a feature point map. The maintaining can include selectively updating feature points in the feature point map based on an assigned classification of the feature points. For example, when a feature points is assigned a first classification, the feature point is updated whenever information indicates that the feature point should be updated. In such an example, when the feature point is assigned a second classification different from the first classification, the feature point forgoes being updated whenever information indicates that the feature point should be updated. A classification can be assigned to a feature point using a classification system on one or more pixels of an image corresponding to the feature point.

27 Claims, 8 Drawing Sheets

(56) References Cited

U.S. PATENT DOCUMENTS

| | | |
|---|---|---|
| 2018/0197307 A1* | 7/2018 | Tomioka .................... G06T 7/60 |
| 2018/0197308 A1* | 7/2018 | Kasuya ...................... G06T 7/50 |
| 2019/0066311 A1* | 2/2019 | Traff ........................ G06T 7/248 |
| 2019/0325595 A1* | 10/2019 | Stein ........................ G08G 1/165 |
| 2020/0302639 A1* | 9/2020 | Park ......................... G06T 7/246 |
| 2021/0142580 A1* | 5/2021 | Caswell ................. G06T 15/005 |

\* cited by examiner

TECHNIQUES FOR MAINTAINING FEATURE POINT MAPS

CROSS-REFERENCE TO RELATED APPLICATIONS

This application claims priority to U.S. Provisional Patent Application Ser. No. 62/841,129, entitled "TECHNIQUES FOR MAINTAINING FEATURE POINT MAPS," filed Apr. 30, 2019, the contents of which is hereby incorporated by reference in its entirety.

FIELD

This disclosure relates generally to feature point maps, and more specifically to techniques for maintaining and managing feature point maps.

BACKGROUND

Objects of a virtual environment may be rendered at positions in a coordinate system using feature point maps. However, maintaining and managing such feature point maps can be difficult.

SUMMARY

The present disclosure describes techniques for maintaining feature point maps. In accordance with some examples, a method for maintaining a feature point map of a real world environment using an electronic device is described. The method comprises receiving, from a recording device, a plurality of feature points corresponding to a location within the real world environment, wherein the plurality of feature points correspond to an image of the location captured by the recording device. The method further comprises determining, based on data extracted from the image of the location, whether an object within the image corresponds to a stationary object. The method further comprises, in accordance with a determination that the object corresponds to the stationary object, updating the feature point map using one or more feature points of the plurality of feature points that correspond to the object within the image. The method further comprises, in accordance with a determination that the object does not correspond to the stationary object, forgoing update of the feature point map using the one or more feature points of the plurality of feature points corresponding to the object within the image.

In some examples, the data extracted from the image of the location comprises pixel information corresponding to the image.

In some examples, the method further comprises accessing a predefined classification system, wherein determining whether the object within the image corresponds to the stationary object includes using the predefined classification system to classify that the object corresponds to the stationary object.

In some examples, determining whether the object within the image corresponds to the stationary object includes identifying whether the object within the image corresponds to a moving object.

In some examples, determining whether the object within the image corresponds to the stationary object includes determining, based on location information received from the recording device, whether the object within the image corresponds to a moving object in the real world environment. In some examples, the method further comprises receiving, from a second recording device, a second plurality of feature points corresponding to the location within the real world environment, wherein the second plurality of feature points correspond to a second image of the location captured by the recording device. In some examples, the method further comprises determining, based on the data extracted from the image of the location and based on second data extracted from the second image of the location, whether the object corresponds to the moving object. In some examples, the method further comprises determining, based on the data extracted from the image of the location, whether a second object within the image corresponds to a known object in the feature point map, wherein: in accordance with a determination that the second object within the image corresponds to the known object in the feature point map, determining whether the object within the image corresponds to the stationary object includes comparing a position of the object within the image to a position of the second object within the image.

In some examples, the method further comprises, in accordance with a determination that the object cannot be determined to correspond to the stationary object and in accordance with a determination that the object cannot be determined to not correspond to the stationary object, forgoing update of the feature point map using the one or more feature points of the plurality of feature points corresponding to the object within the image.

In some examples, determining whether the object within the image corresponds to the stationary object includes: determining a certainty value for the object; and in response to determining the certainty value for the object, determining whether the certainty value is greater than a predefined threshold value for the stationary object.

In some examples, the plurality of feature points received from the recording device corresponds to feature points that have not been filtered out by the recording device prior to transmitting the features points to the electronic device. In some examples, the feature points that have been filtered out by the recording device correspond to feature points that have been determined, locally by the recording device, to correspond to a non-stationary object within the image.

In accordance with some examples, a non-transitory computer-readable storage medium is described. The non-transitory computer-readable storage medium storing one or more programs configured to be executed by one or more processors of an electronic device, the one or more programs including instructions for receiving, from a recording device, a plurality of feature points corresponding to a location within the real world environment, wherein the plurality of feature points correspond to an image of the location captured by the recording device. The instructions further for determining, based on data extracted from the image of the location, whether an object within the image corresponds to a stationary object. The instructions further for, in accordance with a determination that the object corresponds to the stationary object, updating the feature point map using one or more feature points of the plurality of feature points that correspond to the object within the image. The instructions further for, in accordance with a determination that the object does not correspond to the stationary object, forgoing updating the feature point map using the one or more feature points of the plurality of feature points corresponding to the object within the image.

In accordance with some examples, a transitory computer-readable storage medium is described. The non-transitory computer-readable storage medium storing one or more programs configured to be executed by one or more processors of an electronic device, the one or more programs including instructions for receiving, from a recording device, a plurality of feature points corresponding to a location within the real world environment, wherein the plurality of feature points correspond to an image of the location captured by the recording device. The instructions further for determining, based on data extracted from the image of the location, whether an object within the image corresponds to a stationary object. The instructions further for, in accordance with a determination that the object corresponds to the stationary object, updating the feature point map using one or more feature points of the plurality of feature points that correspond to the object within the image. The instructions further for, in accordance with a determination that the object does not correspond to the stationary object, forgoing updating the feature point map using the one or more feature points of the plurality of feature points corresponding to the object within the image.

In accordance with some examples, an electronic device is described. The electronic device comprises one or more processors and memory storing one or more programs configured to be executed by the one or more processors, the one or more programs including instructions for receiving, from a recording device, a plurality of feature points corresponding to a location within the real world environment, wherein the plurality of feature points correspond to an image of the location captured by the recording device. The instructions further for determining, based on data extracted from the image of the location, whether an object within the image corresponds to a stationary object. The instructions further for, in accordance with a determination that the object corresponds to the stationary object, updating the feature point map using one or more feature points of the plurality of feature points that correspond to the object within the image. The instructions further for, in accordance with a determination that the object does not correspond to the stationary object, forgoing updating the feature point map using the one or more feature points of the plurality of feature points corresponding to the object within the image.

In accordance with some examples, an electronic device is described. The electronic device comprises: means for receiving, from a recording device, a plurality of feature points corresponding to a location within the real world environment, wherein the plurality of feature points correspond to an image of the location captured by the recording device; means for determining, based on data extracted from the image of the location, whether an object within the image corresponds to a stationary object; means for, in accordance with a determination that the object corresponds to the stationary object, updating the feature point map using one or more feature points of the plurality of feature points that correspond to the object within the image; and means for, in accordance with a determination that the object does not correspond to the stationary object, forgoing updating the feature point map using the one or more feature points of the plurality of feature points corresponding to the object within the image.

DESCRIPTION

Figure 1A:
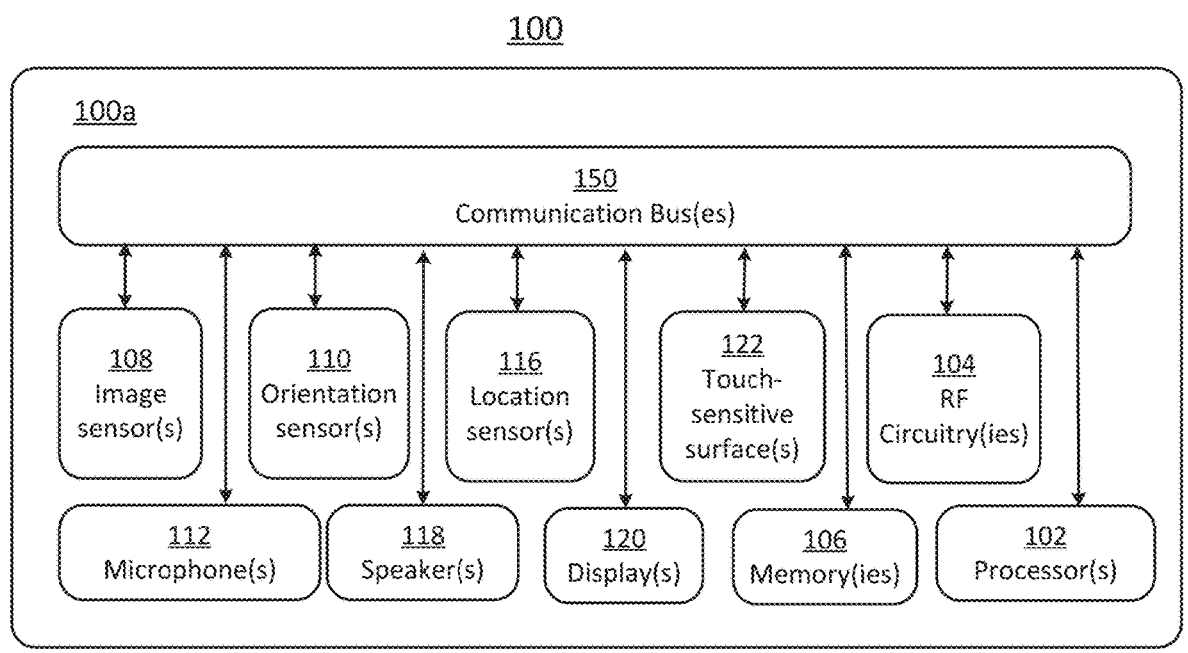
FIGS. 1A-1B depict exemplary systems for use in various computer simulated reality technologies, including virtual reality and mixed reality.

Various examples of electronic systems and techniques for using such systems in relation to various simulated reality technologies, including virtual reality and mixed reality (which incorporates sensory inputs from a physical setting), are described below.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). An MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1B:
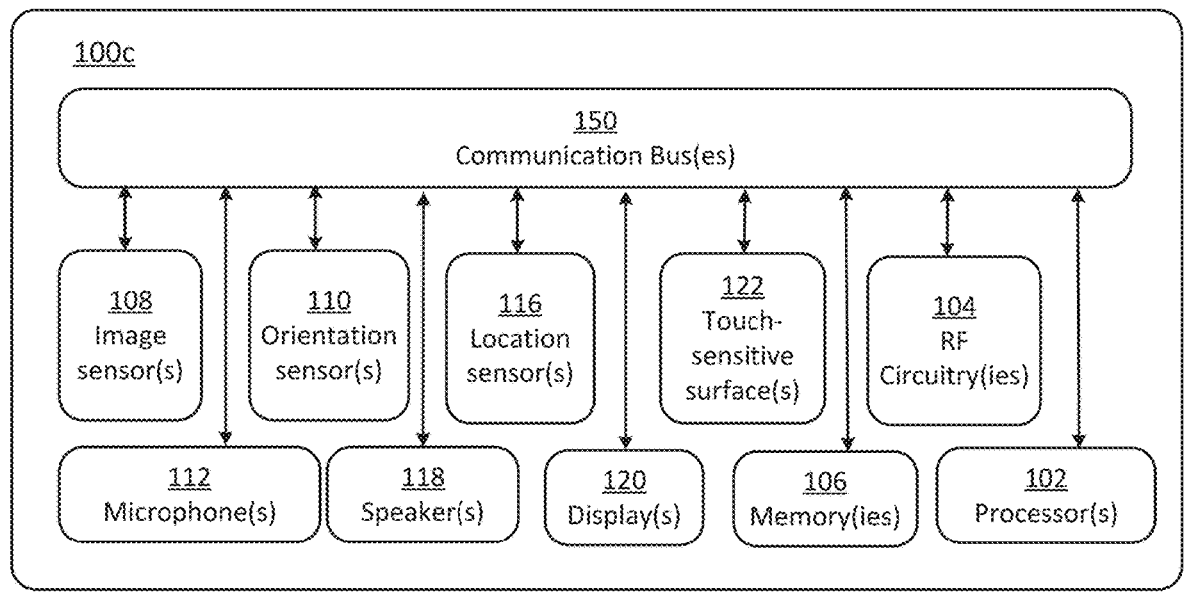
Figure 1B:
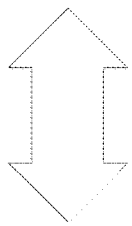
Figure 1B:
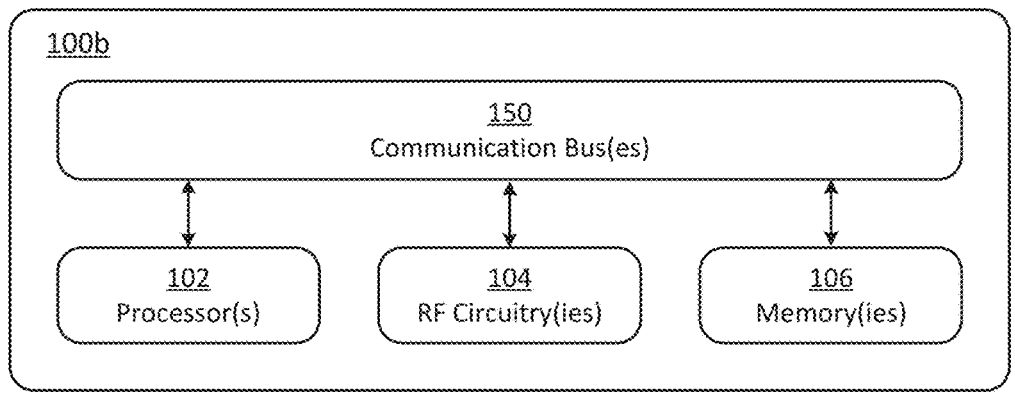

FIG. 1A and FIG. 1B depict exemplary system 100 for use in various simulated reality technologies, including virtual reality and mixed reality.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a second device (e.g., a head-mounted device). In some examples, device 100*a* is implemented in a base station device or a second device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

As discussed above, an SR setting refers to an entirely or partly computer-created setting that individuals can sense and/or with which individuals can interact via an electronic system. In some examples, content to be displayed by the electronic device is determined based on identifying features in a physical setting (sometimes referred to as a real-world environment). The features can be identified by analyzing an image of the physical setting, as further discussed below in FIG. 2.

Figure 2:
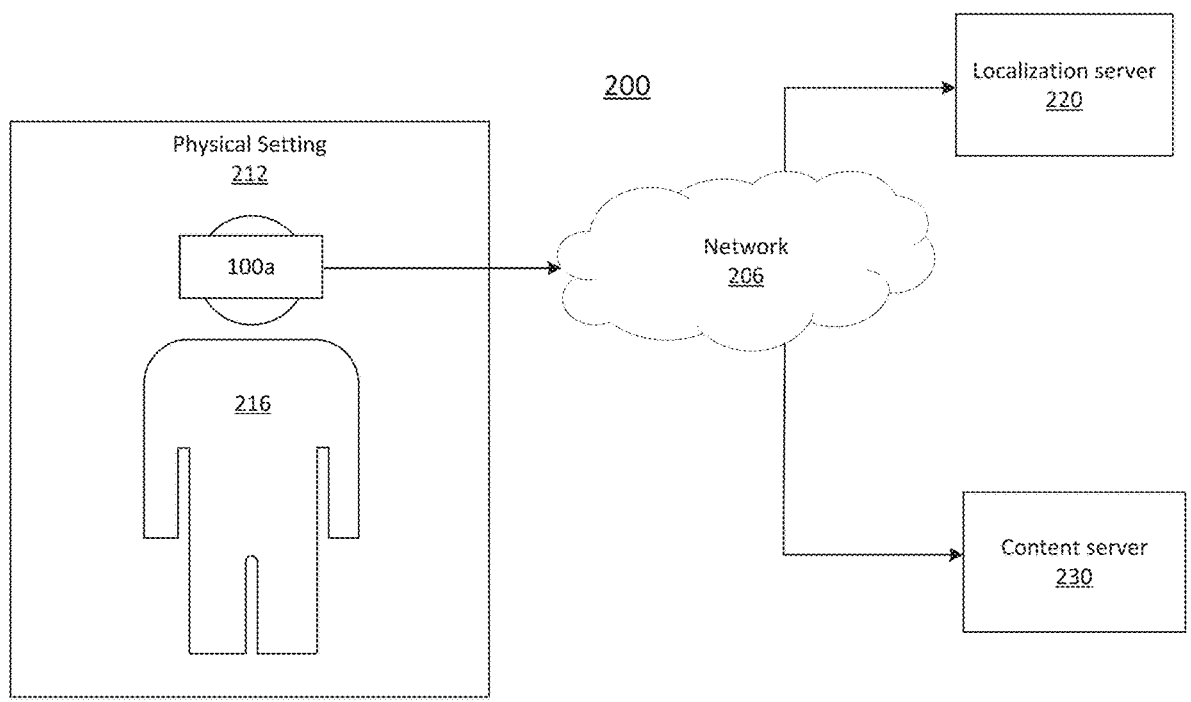
FIG. 2 depicts an exemplary system for providing a simulated reality setting.
Figure 3:
FIG. 3 depicts an exemplary image of a physical setting.

FIG. 2 depicts exemplary system 200 for providing a simulated reality setting. In some examples, system 200 includes device 100a being worn by user 216 in physical setting 212. As discussed above, device 100a includes image sensor(s) 108, which are operable to obtain images of physical elements from the physical setting. FIG. 3 depicts an exemplary image of a physical setting.

In some examples, device 100a is configured to communicate via communication network 106 (e.g., the Internet) with localization server 220. Localization server 220 may be configured to receive images or feature point maps from one or more devices (e.g., device 100a). For example, device 100a can generate a feature point map from an image captured by device 100a and send the feature point map to localization server 220. As another example, device 100a can send an image captured by device 100a to localization server 220 and localization server can generate a feature point map from the image. It should be recognized that localization server 220 can receive images and/or feature point maps from devices other than device 100a.

Figure 4:
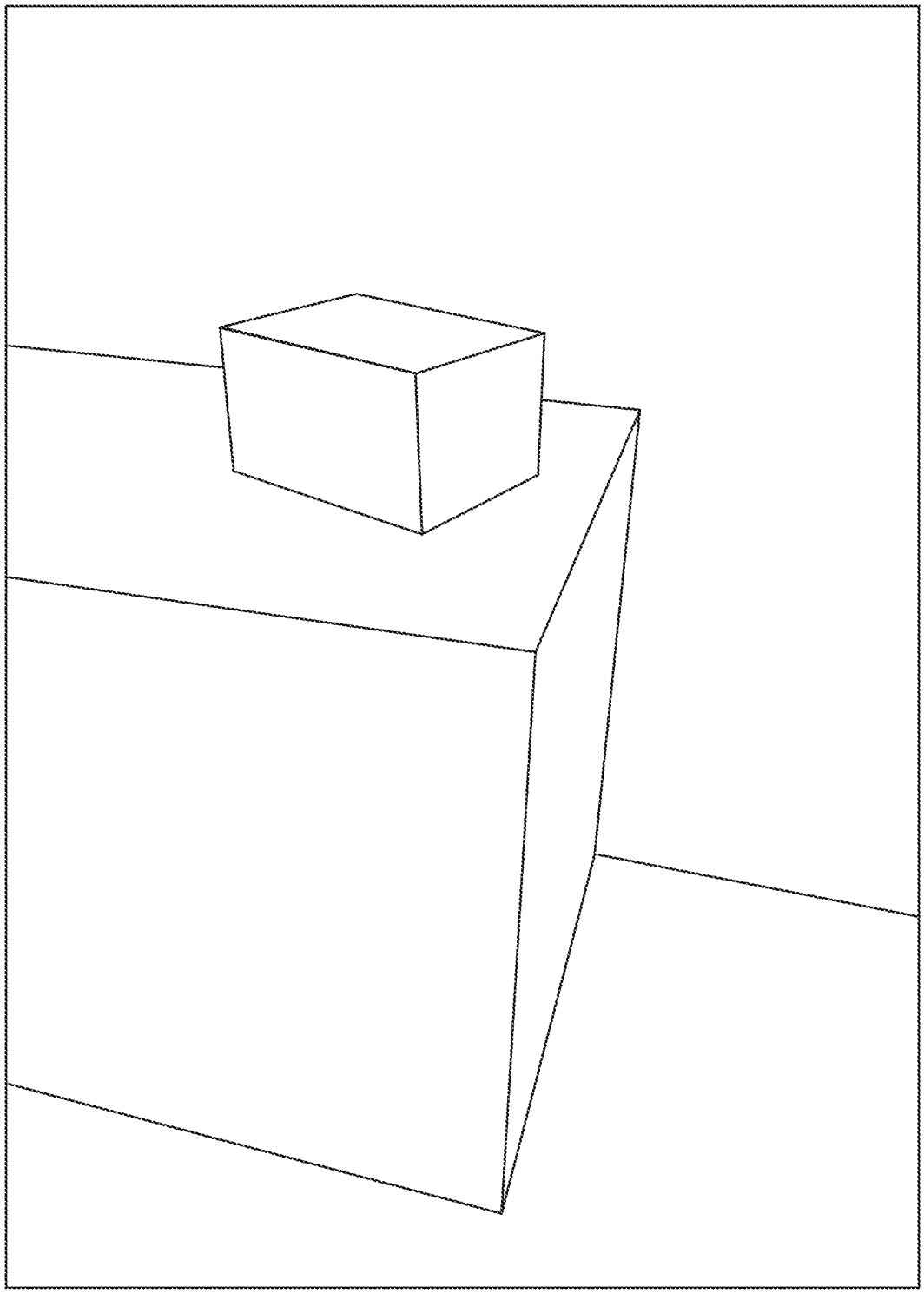
FIG. 4 depicts an exemplary feature point map corresponding to a physical setting.

A feature point map is a collection of feature points (e.g., stored as a list of feature points) that can be used by computer vision systems. A feature point map may be associated with a physical setting and include feature points occurring within the physical setting. FIG. 4 depicts an exemplary feature point map corresponding to a physical setting (e.g., the physical setting captured in the exemplary image of FIG. 3). The exemplary feature point map illustrates that particular points from the exemplary image of FIG. 3 are identified and represented in the exemplary feature point map while other points from the exemplary image of FIG. 3 are not represented in the exemplary feature point map.

A feature point represents a specific structure or feature of an image extracted from the corresponding image data. In some examples, a feature point includes a position (e.g., a position in a global coordinate system). For example, a feature point may include a three-tuple of floats that specify its position. In some examples, a feature point further includes one or more sets of data that describe properties of the feature point (e.g., colors, local textures, or classifications).

In some examples, localization server 220 is configured to access feature point maps stored in a data structure (e.g., a spatially partitioned data structure) and select one or more feature point maps from the data structure based on an approximation of a position or orientation of device 100a. In some examples, the approximation of position and/or orientation may be determined as a coarse localization by device 100a based on data detected by device 100a (e.g., motion sensor data from a global positioning system (GPS), an inertial measurement system, or a wireless signal receiver configured to triangulate a position of device 100a based on wireless signals (e.g., Wi-Fi signals or cellular signals)). In some examples, the estimation of position and/or orientation is sent from device 100a to localization server 200 with a request for a feature point map.

In some examples, device 100a is configured to determine a fine localization pose (as opposed to a coarse localization pose for the coarse localization discussed above) by localizing into a feature point map (received from localization server 220) using one or more images of physical setting 212. For example, bundle adjustment processing (e.g., using a Simultaneous Localization and Mapping (SLAM) algorithm) may be applied to localize into a feature point map to determine the fine localization pose. Localizing into a feature point map can refer to identifying a location within the feature point map that corresponds to a current location in physical setting 212. The fine localization pose may include an approximation of position and an approximation of orientation.

In response to determining the fine localization pose, device 100a may request content corresponding to the fine localization pose. For example, device 100a may send a request for content to a server (e.g., content server 230) via communication network 106. While content server 230 is depicted as a separate server from localization server 220, it should be recognized that the functionality of content server 230 may be provided by device 100, localization server 220, or another server. In some examples, the content describes one or more virtual objects associated with positions in physical setting 212.

In some examples, device 100a is configured to (1) generate a virtual object image including a view of a virtual object based on the fine localization pose and (2) display the virtual object image.

Some techniques described herein relate to maintaining a feature point map. For example, this may include selectively updating feature points in the feature point map based on one or more criteria, such as a time associated with one or more received feature points, a confidence level for one or more received feature points (e.g., the confidence level indicating a likelihood that the one or more received feature points and/or location associated with the one or more received feature points) is accurate, an assigned classification of one or more received feature points (e.g., a category, genre, or grouping of real world objects), or any combination thereof. In some examples, selectively updating causes the feature point map to be (1) change resistant, allowing localization to occur even if a real world environment has undergone normal, day-to-day changes and/or (2) semantically relevant, allowing storage of only feature points associated with certain types of real world objects (e.g., and not storing feature points associated with other types of real world objects).

In an example in which criteria for updating feature point maps include requirements for both time and a confidence level, a feature point in a feature point map is associated with a first time and a received feature point is associated with (1) a second time (more recent than the first time) and (2) a confidence level. In such an example, whether to update the feature point in the feature point map may take into account (1) the magnitude of the confidence level and (2) whether the received feature point was captured after the feature point in the feature point map. In some examples, a device (e.g., device 100a or localization server 220) determines, for instance, to update the feature point in the feature point map in accordance with a determination that the time between the first time and the second time exceeds a threshold value associated with the confidence level of the received feature point.

For an example in which criteria for updating feature point maps include requirements for classifications, a feature point in a feature point map is updated when the feature point is assigned a first classification and is not updated when the feature point is assigned a second classification (e.g., a new feature point is ignored when received rather than compared to a current feature point).

In some examples, a classification (e.g., the first classification or the second classification) is assigned to a feature point using a classification system (e.g., a system executing a computer vision or machine learning technique that operates on an image, segmenting the image into object classes). The classification system may assign the classification to the feature point by analyzing one or more pixels of an image corresponding to the feature point, where a classification of the one or more pixels is assigned to the feature point.

One example of a classification may be whether an element included in one or more pixels of an image is considered static within a threshold (e.g., highly static or moderately static but not mildly static or dynamic). Examples of highly static object classes include walls, floors, windows, doors, ceilings, and ceiling lights. Examples of moderately static object classes include tables, desks, floor lamps, paintings, statues, and sculptures. Examples of mildly static objects include beds, sofas, armchairs, televisions, and computer monitors. Examples of dynamic objects include humans, animals, laptop computers, drink containers, food, papers, books, trash, and writing instruments. In some examples, an object classifier and a feature point scan may execute concurrently, at least in part. In such examples, the feature point scan may store only feature points that are associated with particular object classes (e.g., semantically relevant).

It should be recognized that other types of indications besides classifications may be assigned to a feature point to assist in determining whether to update the feature point. Another example of an indication is a minimum confidence value, where information indicating to update the feature point must exceed the minimum confidence value before the feature point is updated.

In one example, a feature point map corresponds to an image of a physical setting including a dog and a wall. When the image is processed by a classification system, pixels in the image including the dog are assigned a classification of "dynamic" and pixels in the image including the wall are assigned a classification of "static." Once the pixels are assigned a classification, feature points of the feature point map corresponding to the pixels assigned the classification of "dynamic" are assigned the classification of "dynamic" and feature points of the feature point map corresponding to the pixels assigned the classification of "static" are assigned the classification of "static." Feature points of the feature point map assigned the classification of "dynamic" are then updated while feature points of the feature point map assigned the classification of "static" are not updated.

In another example, the feature point map discussed above is configured such that feature points that are classified as "static" are updated when a corresponding pixel has been the same for a threshold number of times (e.g., classified as "static," same pixel value, same location, the like, or any combination thereof). In such an example, feature points that are classified as "static" are updated when a corresponding pixel has been the same for the threshold number of times. Such an example illustrates that classifications may be based on information other than the classification, such as a number of similar, past classifications, a degree of certainty of a particular classification, or the like.

In some examples, multiple feature point maps are stored for a location, and each feature point map corresponds to a different state (e.g., time of day, different ambient light value, or the like, as further described below). For example, a first feature point map may correspond to the location during the day and a second feature point map may correspond to the location during the night. Such a configuration allows the feature point maps to consider a current time so that lighting and other factors that may change an appearance of the location may be addressed. In another example, a first feature point map may correspond to a first ambient light value (e.g., that corresponds to the light value for a cloudy day) and a second feature point map may correspond to a second ambient light value (e.g., that corresponds to the light value for a sunny day). Such a configuration allows the feature point maps to take into account an ambient light value so that lighting and other factors that may change an appearance of the location may be addressed.

Figure 5:
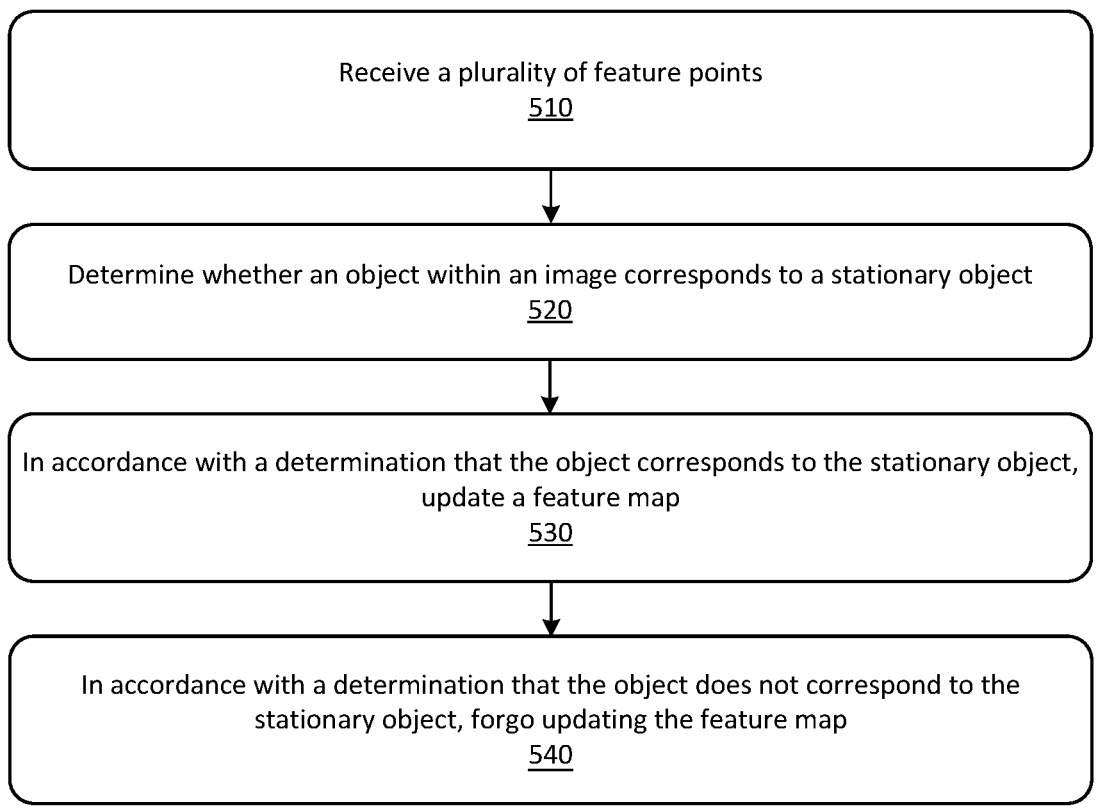
FIG. 5 is a flow diagram for a technique of maintaining a feature point map of a real world environment.

FIG. 5 is a flow diagram for a technique of maintaining a feature point map (e.g., a global feature point map) of a real world environment (e.g., physical setting 212). The technique may be performed by an electronic device, such as a mobile computing device (e.g., device 100a) or a server (e.g., localization server 220).

At block 510, the electronic device (e.g., 220) receives, from a recording device (e.g., 100a, such as a mobile device), a plurality of feature points (e.g., as depicted in FIG. 4) corresponding to a location within the real world environment (e.g., 212), where the plurality of feature points correspond to an image (e.g., a camera frame, as depicted in FIG. 3) of the location captured by the recording device. In some examples, the plurality of feature points received from the recording device corresponds to feature points that have not been filtered out (e.g., using a filtering process or module locally on the recording device) by the recording device prior to transmitting the features points to the electronic device. In such examples, the feature points that have been filtered out by the recording device correspond to feature points that have been determined, locally by the recording device, to correspond to a non-stationary (e.g., moving) object within the image.

At block 520, the electronic device determines (e.g., using a predefined classification system), based on data extracted from the image of the location, whether an object within the image corresponds to a stationary (e.g., static or affixed) object. In some examples, the data extracted from the image of the location comprises pixel information (e.g., a pixel value, such as red-green-blue values) corresponding to the image. In some examples, the electronic device accesses a predefined classification system, where determining whether the object within the image corresponds to the stationary object includes using the predefined classification system to classify that the object corresponds to the stationary object. In some examples, determining whether the object within the image corresponds to the stationary object includes identifying whether the object within the image corresponds to a moving object (e.g., a person, an animal, a vehicle, small non-stationary objects). In other words, in some examples, the determination of whether the object within the image corresponds to the stationary object includes identifying whether or not the object is one that is defined to be a moving object, such as a person, an animal, or a vehicle.

In some examples, determining whether the object within the image corresponds to the stationary object includes determining, based on location information (e.g., Global Positioning System (GPS) information) received from (e.g., streamed from, at different moments in time, etc.) the recording device, whether the object within the image corresponds to a moving object (e.g., a person, an animal, a vehicle, a small non-stationary object, etc.) in the real world environment. In some examples, determining whether the object within the image corresponds to the stationary object includes: determining a certainty value for the object; and in response to determining the certainty value for the object, determining whether the certainty value is greater than a predefined threshold value for the stationary object.

In some examples, the electronic device receives, from a second recording device (e.g., a second mobile device such as a smartphone), a second plurality of feature points corresponding to the location within the real world environment, where the second plurality of feature points correspond to a second image (e.g., a camera frame) of the location captured by the recording device. In such, examples, the electronic device determines (e.g., using a predefined classification system), based on the data extracted from the image of the location and based on second data extracted from the second image of the location, whether the object corresponds to the moving object. In such examples, the electronic device determines, based on the data extracted from the image of the location, whether a second object within the image corresponds to a known object (e.g., an anchor object) in the feature point map, where, in accordance with a determination that the second object within the image corresponds to the known object in the feature point map, determining whether the object within the image corresponds to the stationary object includes comparing a position (e.g., location) of the object within the image to a position (e.g., location) of the second object within the image. In some examples, the second image is an image of the location from a different viewing angle/viewing location as compared to the first image. In some examples, the electronic device determines, based on the data extracted from the image and the second data extracted from the second image, that the object is at a different location within the remote location in the two images, and thus determines that the object corresponds to the moving object.

At 530, the electronic device, in accordance with a determination that the object corresponds to the stationary object (e.g., a wall, a floor, a ceiling, an affixed piece of furniture, etc.), updates the feature point map using one or more feature points of the plurality of feature points corresponding to the object within the image.

At 540, the electronic device, in accordance with a determination that the object does not correspond to the stationary object (e.g., a moving person, object, or animal, such as a walking person, a moving car, or a flying bird), forgoes updating the feature point map using the one or more feature points of the plurality of feature points corresponding to the object within the image.

In some examples, the electronic device, in accordance with a determination that the object cannot be determined to correspond to the stationary object and in accordance with a determination that the object cannot be determined to not correspond to the stationary object (e.g., the determination is undefined), forgoes updating the feature point map using the one or more feature points of the plurality of feature points corresponding to the object within the image.

Some techniques described herein relate to managing a feature point map. For example, this may include adding feature points to the feature point map (or creating a feature point map) using feature points captured by multiple devices (e.g., recording devices) and/or by a single device at different times. The resulting feature point map may be referred to as a global feature point map, storing feature points from multiple feature point maps. The global feature point map may be stored in a global feature point database accessible by a server (e.g., localization server 220) so that the server may provide the global feature point map (or a portion of the global feature point map) to devices requesting feature point maps for particular locations. In such examples, the global feature point map may allow a user to localize in locations without having to scan for feature points (or without having to perform a detailed scan) in the locations. In this manner, the user can localize in locations in which the user has never previously visited.

In at least one illustrative example, a simulated reality application is executing on an electronic device (e.g., device 100a). While executing, the simulated reality application is detecting feature points in a real world environment (e.g., physical setting 212). The electronic device is also executing a background process to send the feature points (e.g., one at a time or as a set of multiple feature points in the form of a feature point map) to a remote server (e.g., localization server 220) including a database and an agent process. In some examples, the database is configured to store a feature point map (e.g., global feature point map) and the agent process is configured to receive feature points and process them to determine whether to add the feature points to the global feature point map. In some examples, the agent process classifies feature points (e.g., as discussed above) (or the feature points are already associated with a classification when received by the agent process) and adds (based on location information (e.g., Global Positioning System (GPS) coordinates, latitude and longitude coordinates, compass heading, etc.) associated with the feature points) the feature points to the global feature point map when the classification satisfies one or more criteria for adding the feature points. For example, the agent process may use the location information to determine where in the global feature point map that the feature points correspond.

In some examples, adding feature points to the global feature point map is based on one or more feature points having a confidence level exceeding a threshold. These one or more feature points are sometimes referred to as hero feature points, as they are the ground truth. In such examples, the hero feature points are not modified but new feature points are added around the hero feature points to grow the global feature point map.

In some examples, feature points may be anonymized using one or more of the following techniques. In some examples, feature points may be grouped in a way such that the feature points no longer correspond to an image (e.g., feature points may be grouped across images or divided in a single image). In some examples, feature points may be transmitted at different times relative to when the feature points are captured. In some examples, feature points from a first location, a first time, or a first user may be mixed with features points from a second location, a second time, or a second user. It should be recognized that these and any number of other techniques for anonymizing data may be used to address privacy concerns in transmitting feature points to and storing feature points in a central location.

Figure 6:
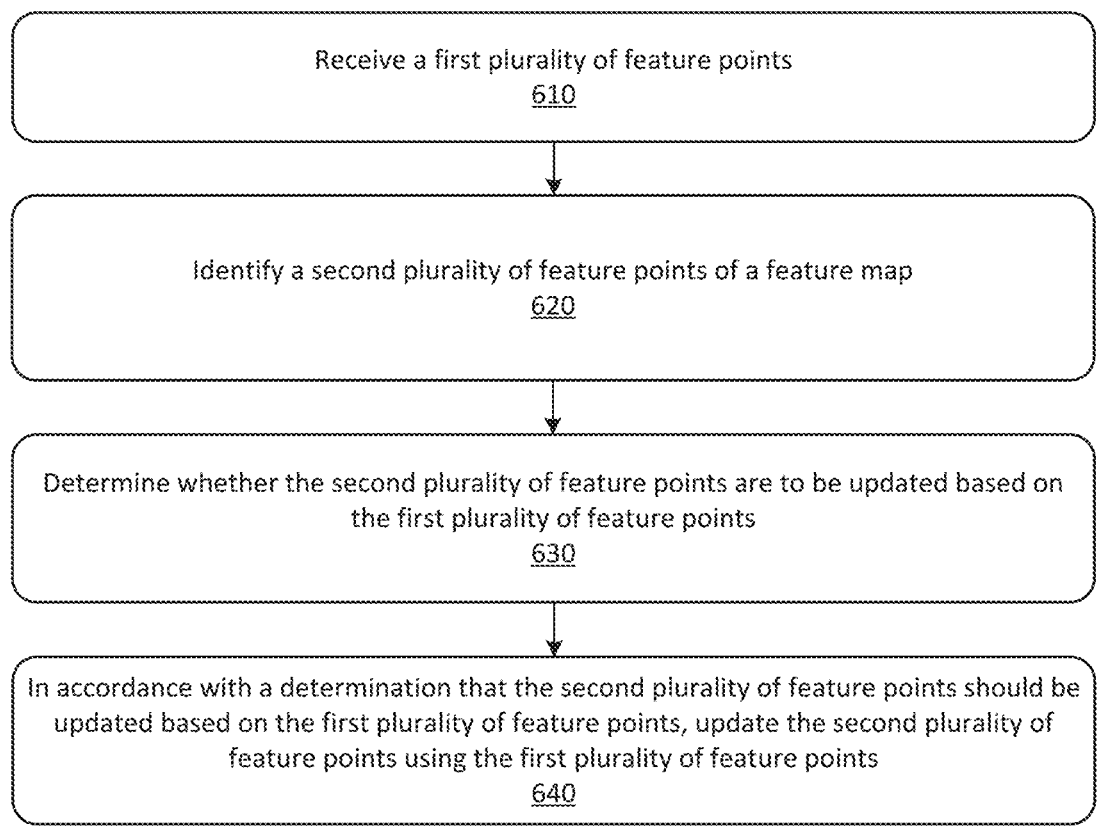
FIG. 6 is a flow diagram for a technique of managing a feature point map corresponding to one or more locations within a real world environment.

FIG. 6 is a flow diagram for a technique of managing a feature point map (e.g., a global feature point map) corresponding to one or more locations within a real world environment (e.g., physical setting 212). The technique may be performed by an electronic device, such as a mobile computing device (e.g., device 100a) or a server (e.g., localization server 220).

At block 610, the electronic device (e.g., 220) receives a first plurality of feature points corresponding to a location within the real world environment. The first plurality of feature points includes a first set of feature points from a first series of one or more images captured by a first recording device (e.g., a remote electronic device such as a user's smartphone) and a second set of feature points from a second series of one or more images captured by a second recording device different from the first electronic device. In some examples, the first recording device and the second recording device belong to different users. In some examples, the second images are a different view (e.g., from a different viewpoint) of the location as compared to the first images. In some examples, the first images and the second images are captured at different times. The first plurality of feature points includes data corresponding to one or more characteristics of the location (e.g., metadata such as GPS information, longitude/latitude information, and/or heading and course information).

At block 610, the electronic device identifies, based on the data corresponding to the one or more characteristics of the location, a second plurality of feature points of the feature point map. The second plurality of feature points of the feature point map at least partially correspond to the first plurality of feature points (e.g., existing feature points that correspond to the same location as the new feature points). In some examples, the data corresponding to the one or more characteristics of the location includes GPS data of the location. In some examples, the data corresponding to the one or more characteristics of the location includes a first time data corresponding to one or more times (e.g., one or more time stamps or a time period) during which the first set of one or more images were captured and a second time data corresponding to one or more times (e.g., one or more time stamps or a time period) during which the second set of one or more images were captured.

In some examples, identifying, based on the data corresponding to the one or more characteristics of the location, the second plurality of feature points of the feature point map includes: identifying, based on the data corresponding to the one or more characteristics of the location, one or more reference feature points (e.g., of one or more reference feature point maps stored on the electronic device (e.g., a server)) that correspond to one of more of the first plurality of feature points; and in response to identifying the one or more reference feature points, using the reference feature points to match (e.g., map, correlate, associate) the first plurality of feature points with the second plurality of feature points.

In some examples, the electronic device identifies, based on the data corresponding to the one or more characteristics of the location, the second plurality of feature points of the feature point map, wherein the feature point map corresponds to one of a plurality of feature point maps (e.g., stored on electronic device (e.g., a server)) including the feature point map and a second feature point map, and wherein: feature points of the feature point map correspond to images captured during a first time period (e.g., during morning hours, during afternoon hours, during nighttime) of a day (e.g., and does not correspond to images captured during the second time period of the day), and features points of the second feature point map correspond to images captured during a second time period of the day (e.g., and does not correspond to images captured during the first time period of the day).

At block 630, the electronic device determines whether the second plurality of feature points are to be updated (e.g., replaced) based on the first plurality of feature points. In some examples, determining whether the second plurality of feature points are to be updated (e.g., replaced) based on the first plurality of feature points includes determining, based on the first time data and the second time data, whether the first plurality of feature points correspond to images that were captured more recently than images corresponding to the second plurality of feature points.

At block 640, the electronic device, in accordance with a determination that the second plurality of feature points should be updated based on the first plurality of feature points, updates the second plurality of feature points using the first plurality of feature points. In some examples, determining whether the second plurality of feature points are to be updated (e.g., replaced) based on the first plurality of feature points includes determining (e.g., using a predefined classification system) whether the second plurality of feature points correspond to a stationary object (e.g., a static or affixed object) within the real world environment.

In some examples, the electronic device, in accordance with a determination that the second plurality of feature points should not be updated based on the first plurality of feature points, forgoes updating the second plurality of feature points using the first plurality of feature points.

Figure 7:
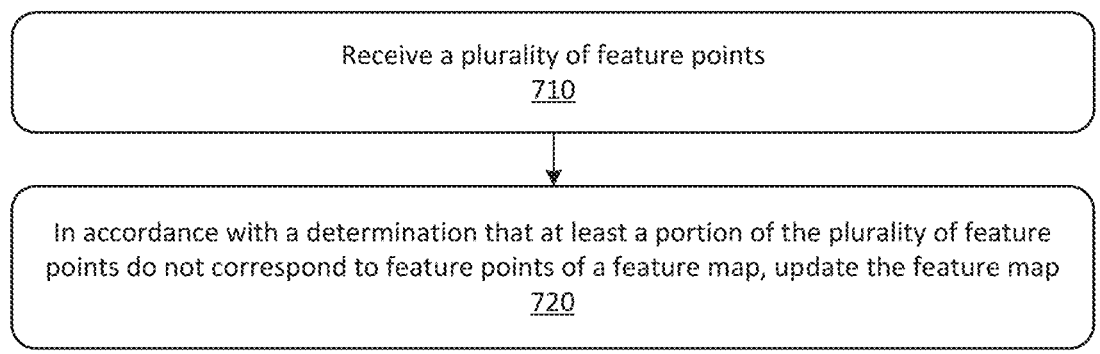
FIG. 7 is flow diagram for a technique of managing a feature point map corresponding to one or more locations within a real world environment.

FIG. 7 is flow diagram for technique of managing a feature point map (e.g., a global feature point map) corresponding to one or more locations within a real world environment (e.g., physical setting 212). The technique may be performed by an electronic device, such as a mobile computing device (e.g., device 100*a*) or a server (e.g., localization server 220).

At block 710, the electronic device (e.g., 220) receives a plurality of feature points corresponding to a location within the real world environment. In some examples, the plurality of feature points includes a first set of feature points from a first series of one or more images captured by a first recording device (e.g., a remote electronic device such as a user's smartphone) and a second set of feature points from a second series of one or more images captured by a second recording device different from the first electronic device. In some examples, the plurality of feature points includes data corresponding to one or more characteristics of the location (e.g., metadata such as GPS information, longitude/latitude information, and/or heading and course information). In some examples, the first recording device and the second recording device belong to different users. In some examples, the second images are a different view (e.g., from a different viewpoint) of the location as compared to the first images. In some examples, the first images and the second images are captured at different times.

In some examples, the first series of one or more images captured by the first recording device include the location captured from a first viewpoint. In some examples, the second series of one or more images captured by the second recording device include the location captured from a second viewpoint different from the first viewpoint, wherein at least a portion of a region (e.g., an area within the location and/or a stationary object within the location) within the location is captured from the first viewpoint and from the second viewpoint (e.g., such that there is an identifiable overlap between the first viewpoint of the location and the second viewpoint of the location). In some examples, a subset of the plurality of feature points corresponds to the portion of the region within the location that is captured from the first viewpoint and from the second viewpoint. In some examples, the data corresponding to the one or more characteristics of the location includes GPS data of the location. In some examples, the data corresponding to the one or more characteristics of the location includes a first time data corresponding to one or more times (e.g., one or more time stamps or a time period) during which the first set of one or more images were captured and a second time data corresponding to one or more times (e.g., one or more time stamps or a time period) during which the second set of one or more images were captured.

At block 720, the electronic device, in accordance with a determination, based on the data corresponding to the one or more characteristics of the location, that at least a portion of the plurality of feature points do not correspond to feature points of the feature point map (e.g., existing feature points known by the feature point map), updates the feature point map by adding the portion of the plurality of feature points to the feature point map based on the data corresponding to the one or more characteristics of the location. In some examples, adding the portion of the plurality of feature points to the feature point map comprises adding the subset of the feature points corresponding to the portion of the region in accordance with a determination that an overlap criteria is satisfied. In such examples, the overlap criteria is satisfied when the portion of the region within the location that is captured from the first viewpoint and from the second viewpoint corresponds to (e.g., represents) at least a predefined amount of the region. For example, if the region is a stationary object within the location, the overlap criteria is satisfied if at least a predefined amount (e.g., 50%) of the object may be identified/recognized from both the first viewpoint and the second viewpoint of the location.

In some examples, the electronic device, in accordance with a determination, based on the data corresponding to the one or more characteristics of the location, that at least a second portion of the plurality of feature points correspond to feature points of the feature point map (e.g., existing feature points known by the feature point map), updates, based on the data corresponding to the one or more characteristics of the location, the feature point map using the second portion of the plurality of feature points (e.g., by replacing existing feature points that map to the plurality of feature points with the plurality of feature points).

Aspects of the techniques described above contemplate the possibility of gathering and using personal information to provide images to a server. Such information should be collected with the user's informed consent.

Entities handling such personal information will comply with well-established privacy practices and/or privacy policies (e.g., that are certified by a third-party) that are (1)

generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

What is claimed is:

1. An electronic device, comprising:
   one or more processors; and
   memory storing one or more programs configured to be executed by the one or more processors, the one or more programs including instructions for:
      receiving, from a recording device, a plurality of feature points corresponding to a location within a real world environment, wherein the plurality of feature points correspond to an image of the location captured by the recording device;
      determining, based on data extracted from the image of the location, whether an object within the image corresponds to a stationary object;
      in accordance with a determination that the object corresponds to the stationary object, updating a feature point map using one or more feature points of the plurality of feature points corresponding to the object within the image;
      in accordance with a determination that the object does not correspond to the stationary object, forgoing updating the feature point map using the one or more feature points of the plurality of feature points corresponding to the object within the image; and
      in accordance with a determination that the object cannot be determined to correspond to the stationary object and in accordance with a determination that the object cannot be determined to not correspond to the stationary object, forgoing updating the feature point map using the one or more feature points of the plurality of feature points corresponding to the object within the image.

2. The electronic device of claim 1, wherein the data extracted from the image of the location comprises pixel information corresponding to the image.

3. The electronic device of claim 1, the one or more programs further including instructions for:
   accessing a predefined classification system, wherein determining whether the object within the image corresponds to the stationary object includes using the predefined classification system to classify that the object corresponds to the stationary object.

4. The electronic device of claim 1, wherein determining whether the object within the image corresponds to the stationary object includes identifying whether the object within the image corresponds to a moving object.

5. The electronic device of claim 1, wherein determining whether the object within the image corresponds to the stationary object includes determining, based on location information received from the recording device, whether the object within the image corresponds to a moving object in the real world environment.

6. The electronic device of claim 5, the one or more programs further including instructions for:
   receiving, from a second recording device, a second plurality of feature points corresponding to the location within the real world environment, wherein the second plurality of feature points correspond to a second image of the location captured by the recording device; and
   determining, based on the data extracted from the image of the location and based on second data extracted from the second image of the location, whether the object corresponds to the moving object.

7. The electronic device of claim 5, the one or more programs further including instructions for:
   determining, based on the data extracted from the image of the location, whether a second object within the image corresponds to a known object in the feature point map, wherein:
      in accordance with a determination that the second object within the image corresponds to the known object in the feature point map, determining whether the object within the image corresponds to the stationary object includes comparing a position of the object within the image to a position of the second object within the image.

8. The electronic device of claim 1, wherein determining whether the object within the image corresponds to the stationary object includes:
   determining a certainty value for the object; and
   in response to determining the certainty value for the object, determining whether the certainty value is greater than a predefined threshold value for the stationary object.

9. The electronic device of claim 1, wherein the plurality of feature points received from the recording device corresponds to feature points that have not been filtered out by the recording device prior to transmitting the features points to the electronic device.

10. The electronic device of claim 9, wherein the feature points that have not been filtered out by the recording device correspond to feature points that have been determined, locally by the recording device, to correspond to a non-stationary object within the image.

11. A non-transitory computer-readable storage medium storing one or more programs configured to be executed by one or more processors of an electronic device, the one or more programs including instructions for:
   receiving, from a recording device, a plurality of feature points corresponding to a location within a real world environment, wherein the plurality of feature points correspond to an image of the location captured by the recording device;
   determining, based on data extracted from the image of the location, whether an object within the image corresponds to a stationary object;
   in accordance with a determination that the object corresponds to the stationary object, updating a feature point map using one or more feature points of the plurality of feature points corresponding to the object within the image;
   in accordance with a determination that the object does not correspond to the stationary object, forgoing updating the feature point map using the one or more feature points of the plurality of feature points corresponding to the object within the image; and in accordance with a determination that the object cannot be determined to correspond to the stationary object and in accordance with a determination that the object cannot be determined to not correspond to the stationary object, forgoing updating the feature point map using the one or more feature points of the plurality of feature points corresponding to the object within the image.

12. The non-transitory computer-readable storage medium of claim 11, wherein the data extracted from the image of the location comprises pixel information corresponding to the image.

13. The non-transitory computer-readable storage medium of claim 11, the one or more programs further including instructions for:
accessing a predefined classification system, wherein determining whether the object within the image corresponds to the stationary object includes using the predefined classification system to classify that the object corresponds to the stationary object.

14. The non-transitory computer-readable storage medium of claim 11, wherein determining whether the object within the image corresponds to the stationary object includes identifying whether the object within the image corresponds to a moving object.

15. The non-transitory computer-readable storage medium of claim 11, wherein determining whether the object within the image corresponds to the stationary object includes determining, based on location information received from the recording device, whether the object within the image corresponds to a moving object in the real world environment.

16. The non-transitory computer-readable storage medium of claim 15, the one or more programs further including instructions for:
receiving, from a second recording device, a second plurality of feature points corresponding to the location within the real world environment, wherein the second plurality of feature points correspond to a second image of the location captured by the recording device; and
determining, based on the data extracted from the image of the location and based on second data extracted from the second image of the location, whether the object corresponds to the moving object.

17. The non-transitory computer-readable storage medium of claim 15, the one or more programs further including instructions for:
determining, based on the data extracted from the image of the location, whether a second object within the image corresponds to a known object in the feature point map, wherein:
in accordance with a determination that the second object within the image corresponds to the known object in the feature point map, determining whether the object within the image corresponds to the stationary object includes comparing a position of the object within the image to a position of the second object within the image.

18. The non-transitory computer-readable storage medium of claim 11, wherein determining whether the object within the image corresponds to the stationary object includes:
determining a certainty value for the object; and
in response to determining the certainty value for the object, determining whether the certainty value is greater than a predefined threshold value for the stationary object.

19. The non-transitory computer-readable storage medium of claim 11, wherein the plurality of feature points received from the recording device corresponds to feature points that have not been filtered out by the recording device prior to transmitting the features points to the electronic device.

20. The non-transitory computer-readable storage medium of claim 19, wherein the feature points that have not been filtered out by the recording device correspond to feature points that have been determined, locally by the recording device, to correspond to a non-stationary object within the image.

21. A method for maintaining a feature point map of a real world environment using an electronic device, comprising:
receiving, from a recording device, a plurality of feature points corresponding to a location within the real world environment, wherein the plurality of feature points correspond to an image of the location captured by the recording device;
determining, based on data extracted from the image of the location, whether an object within the image corresponds to a stationary object;
in accordance with a determination that the object corresponds to the stationary object, updating the feature point map using one or more feature points of the plurality of feature points corresponding to the object within the image; and
in accordance with a determination that the object does not correspond to the stationary object, forgoing updating the feature point map using the one or more feature points of the plurality of feature points corresponding to the object within the image; and
in accordance with a determination that the object cannot be determined to correspond to the stationary object and in accordance with a determination that the object cannot be determined to not correspond to the stationary object, forgoing updating the feature point map using the one or more feature points of the plurality of feature points corresponding to the object within the image.

22. The method of claim 21, wherein the data extracted from the image of the location comprises pixel information corresponding to the image.

23. The method of claim 21, further comprising:
accessing a predefined classification system, wherein determining whether the object within the image corresponds to the stationary object includes using the predefined classification system to classify that the object corresponds to the stationary object.

24. The method of claim 21, wherein determining whether the object within the image corresponds to the stationary object includes identifying whether the object within the image corresponds to a moving object.

25. The method of claim 21, wherein determining whether the object within the image corresponds to the stationary object includes determining, based on location information received from the recording device, whether the object within the image corresponds to a moving object in the real world environment.

26. The method of claim 25, further comprising:
receiving, from a second recording device, a second plurality of feature points corresponding to the location within the real world environment, wherein the second plurality of feature points correspond to a second image of the location captured by the recording device; and
determining, based on the data extracted from the image of the location and based on second data extracted from the second image of the location, whether the object corresponds to the moving object.

27. The method of claim 25, further comprising:
determining, based on the data extracted from the image of the location, whether a second object within the image corresponds to a known object in the feature point map, wherein:
   in accordance with a determination that the second object within the image corresponds to the known object in the feature point map, determining whether the object within the image corresponds to the stationary object includes comparing a position of the object within the image to a position of the second object within the image.

* * * * *